United States Patent [19]

Suzuki et al.

[11] Patent Number: 4,909,634
[45] Date of Patent: Mar. 20, 1990

[54] STIRRING DEVICE

[75] Inventors: Isoo Suzuki, Shiga; Taro Koshina; Makoto Irie, both of Nagoya; Shigeaki Takeda; Toyohiko Kubo, both of Kyoto; Masahiro Inoki, Hirakata, all of Japan

[73] Assignees: Sanyo Chemical Industries, Ltd., Kyoto; Hosokawa Micron Corporation, Osaka, both of Japan

[21] Appl. No.: 310,152

[22] Filed: Feb. 14, 1989

[30] Foreign Application Priority Data

Jul. 4, 1988 [JP] Japan ................................ 63-166436

[51] Int. Cl.⁴ ................................................ B01F 7/04
[52] U.S. Cl. ..................................... 366/307; 366/313; 366/330
[58] Field of Search ............... 366/302, 305, 306, 307, 366/309, 312, 52, 57, 67, 80, 253, 325, 303, 304, 317, 310, 313, 330; 422/225–229, 259, 286, 287; 425/DIG. 230, 200, 208

[56] References Cited

U.S. PATENT DOCUMENTS

| | | | |
|---|---|---|---|
| 56,520 | 7/1866 | Brigham | 366/302 |
| 271,242 | 1/1883 | Hobbs | 366/307 |
| 493,603 | 3/1893 | Sibley | 366/307 |
| 1,246,003 | 11/1917 | Hoodley | 366/290 |
| 1,941,808 | 1/1934 | McConnaughay | 366/302 |
| 2,283,008 | 5/1942 | LeBar et al. | 366/307 |
| 2,779,752 | 1/1957 | Vining | 366/307 |
| 3,458,894 | 8/1969 | Wheeler | 366/80 |
| 3,652,062 | 3/1972 | Baker | 366/80 |
| 3,873,072 | 3/1975 | Blackmon | 366/80 |
| 3,981,658 | 9/1976 | Briggs | 366/80 |
| 4,154,798 | 5/1979 | Bittner | 366/307 |
| 4,347,986 | 7/1982 | Haddon | 241/74 |
| 4,482,254 | 11/1984 | Kessler et al. | 366/302 |
| 4,629,326 | 12/1986 | Huls | 366/307 |

FOREIGN PATENT DOCUMENTS

| | | | |
|---|---|---|---|
| 1173787 | 7/1964 | Fed. Rep. of Germany | 366/302 |
| 320962 | 12/1902 | France | 366/297 |
| 56-16940 | 4/1981 | Japan . | |
| 856516 | 8/1981 | U.S.S.R. | 366/603 |
| 1242037 | 8/1971 | United Kingdom . | |

Primary Examiner—Harvey C. Hornsby
Assistant Examiner—Joseph S. Machuga
Attorney, Agent, or Firm—Edwin E. Greigg

[57] ABSTRACT

A stirring device having a casing for forming a stirring chamber, a driving rotary shaft disposed in the casing, a plurality of stirring paddles fitted on the rotary shaft as being dispersed axially of the shaft and a plurality of projections attached to an interior wall surface of the casing. The projections are provided adjacent each other at least one in number on each operational track of a leading edge of the paddle so as to remove excess substance adhered to the paddle thereby preventing frictional wear of the casing by the substance. Also, because of an interspace provided between an axially adjacent pair of projections, the projections do not obstruct the stirring operation of the device.

8 Claims, 1 Drawing Sheet

STIRRING DEVICE

BACKGROUND OF THE INVENTION

1. Field of the invention

The present invention relates to a stirring device for mixing, drying, granulating or the like, and more particularly to a stirring device of the above type having a rotary drive shaft disposed inside a casing forming a stirring chamber and a plurality of paddles are fitted on the rotary shaft axially thereof.

2. Description of the prior art

According to a conventional stirring device of the above-noted type, the entire periphery of the interior casing surface facing the leading edge of the paddle is formed flat and smooth.

However, as is often the case with a stirring/mixing process of e.g. polyether and water-soluble polymer powder, with such a flat and smooth interior surface, there tends to occur adhesion of the processed substance to the operating paddle. The adhered substance grdually accumulates and hardens on the paddle and such accumulation causes a sliding action, i.e. frictional contact with the interior casing surface with each rotation of a paddle. Moreover, if the paddle keeps rotating with such viscous process-object substance adhered thereto, this means that there occurs constant mutual movement between the adhered substance and the paddle. In other words, the material is not fed from the inlet toward the outlet, but merely churned. These phenomena cause the troubles at specified below:

(a) As the repeated sliding contacts wear out the interior surface, the casing will be damaged quickly. Also, the fallout material of the worn-out surface will mix into the processed substance thereby deteriorating its quality.

(b) The paddle per se will also be damaged quickly from the mutual movement with the adhered substance.

(c) The paddle will be physically deformed due to a bending moment constantly applied thereto.

(d) There will occur significant power loss in the paddle rotation.

(e) The frictional contacts will cause considerably vibrations and noises.

Further, when a stirring process is carried out by the conventional device on a mixture of a water liquid containing water or additive added to a granule substance, the same troubles as noted above will occur.

SUMMARY OF THE INVENTION

The primary object of the present invention is to overcome the above troubles of the prior device through a simple improvement and to provide a stirring device which is superior in durability, maintenance and performance.

For accomplishing the above object, a stirring device according to the present invention is characterized by a plurality of projections formed on the interior casing surface with projections being provided at least one an an operational track of the leading edge of each stirring paddle and adjacent to the opposing edge and with adjacent projections disposed axially of the driving shaft and interspaced radially of the same.

With the above features of the present invention, even if the substance to be processed is easily adherable to and hardenable on the paddle, when the adhered substance develops in physical dimension to some extent, the substance strikes against the projection which is adjacent to and opposing the paddle leading edge, whereby the excess substance may be effectively removed from the paddle by the striking impact.

Consequently, the frictional damage of the casing by the adhered substance may be advantageously prevented, thereby significantly prolonging the service life of the casing and eliminating the quality deterioration of the processed substance due to the inadvertent mixing of the fallouts of the casing material into the processed substance.

Also, since the excess substance may thus be effectively removed from the stirring paddle, it becomes possible to prevent such frictional damage of the paddle per se due to the mutual movement with the substance.

Moreover, since the striking, i.e. substance-removing impact on the paddle is small because of the limited amount of substance adhered thereto and is only of momentary nature, the paddle will hardly be deformed by this impact.

In addition, now that the constant frictional and sliding contact between the casing surface and the adhered substance has been eliminated, the power loss in the paddle rotation and the generations of vibrations and noises may be advantageously avoided.

Also, since the plurality of projections are provided independently of each other, even if there occurs a frictional damage or deformation in one or some of the projections, this or these projections alone may be replaced without replacing all of the projections.

Further, since the projections are provided one on each operational track of the leading edge of paddle with each projection having a narrow width substantially corresponding to the width of the track and a pair of projections adjacent axially of the driving shaft being disposed with the radial interspace therebetween, it becomes also possible to prevent inadvertent holding or clogging of the processed substance between the projections and the interior casing surface, whereby the stirring operation may be carried out effectively without being obstructed by the projections.

As a result, according to the stirring device of the present invention, even if the processed substance is readily adherable to and hardenable on the stirring paddles, frictional damages of the casing and paddles due to accumulated adherence of the substance to the paddles or casing may be effectively avoided. Besides, the stirring device may be maintained very easily and inexpensively. The device also achieves significant reductions in vibration and noise generation. Consequently, the stirring device of the present invention may operate in good condition for an extended service life without the trouble of inadvertent mixing of foreign matter into the processed substance. That is, the present invention has achieved a stirring device which is superior to the prior devices in all the respects of durability, maintenacne and performance.

BRIEF DESCRIPTION OF THE DRAWINGS

Accompanying drawings illustrate one preferred embodiment of the present invention; in which.

DESCRIPTION OF THE PREFERRED EMBODIMENTS

Figure 1:
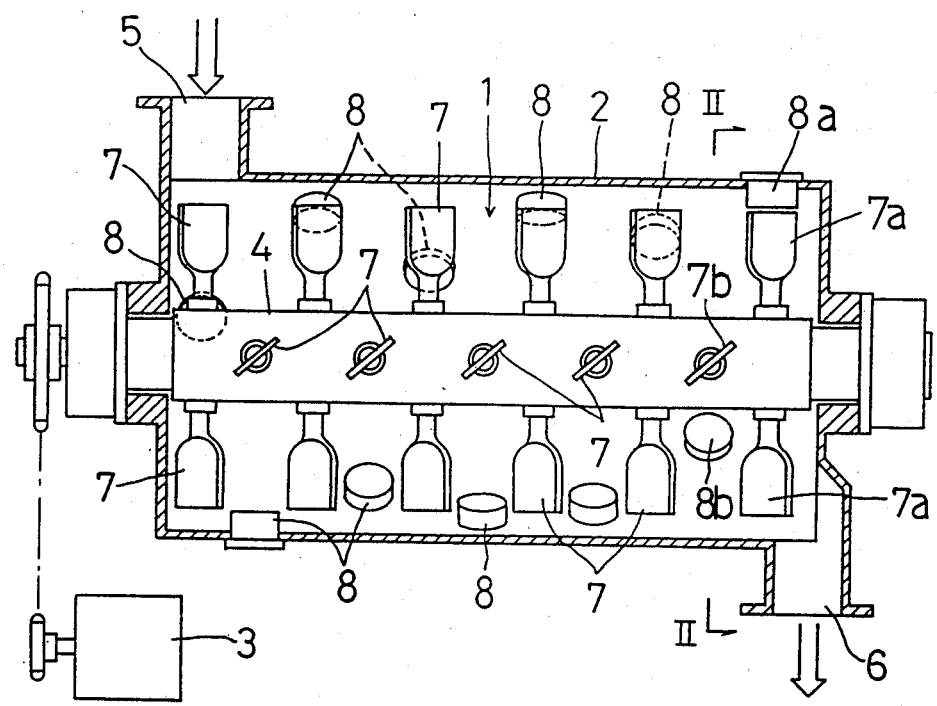
FIG. 1 is a section view.
Figure 2:
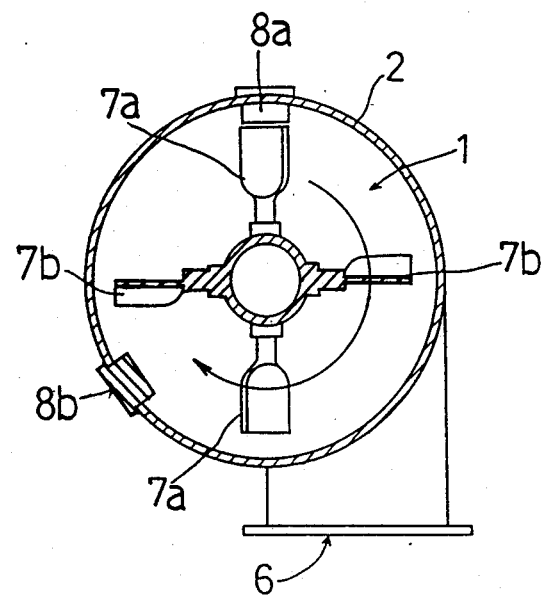
FIG. 2 is a perspective view taken along a line II—II of FIG. 1.

FIGS. 1 and 2 show one preferred embodiment of a stirring device related to the present invention.

Centrally inside a casing 2 having a cylindrical interior surface and forming a stirring chamber 1, there is disposed a driving rotary shaft 4 oriented horizontally and operatively connected with a driving apparatus 3. On right and left ends of the casing 2, there are formed an inlet opening 5 for introducing a a substance to be processed therethrough and an outlet opening 6 for discharging the processed substance therefrom, respectively. A plurality of stirring paddles 7 are fixedly fitted on the rotary driving rotary shaft 4. These together will constitute a continuous processing type stirring device.

More particularly, the plurality of stirring paddles 7 are dispersed axially and radially of the rotary driving shaft 4, with a pair of paddles 7 being disposed on the same axial position on the shaft while being disposed opposite to each other across the shaft. Further, an axially adjacent pair of paddles 7 are radially displaced by 90 degrees.

The stirring faces of the paddles 7 are so oriented as to transport by rotation thereof the processed substance toward the outlet opening 6.

On the peripheral portion of the cylindrical interior surface of the casing 2 along the operational tracks of the leading edges of the paddles 7, there are replacably disposed a plurality of projections 8, with one projection 8 being provided on each operational track and with each projection 8 having a narrow width substantially corresponding to the width of the track and a pair of projections 8 adajcent disposed axially of the driving shaft and arranged with a radial interspace therebetween.

With the above arrangement in operation, substance any adhered to the leading edge of the paddle 7 may be effectively removed through a striking impact with the projection 8. Also, since the substance moves through the interspace between the axially adjacent pair of projections 8, there occurs no clogging of the substance at the portion, whereby the entire stirring device may efficiently stir the substance.

Preferably, during one rotation of the rotary driving shaft 4, the paddles 7 and the projections 8 successively come into opposition for a plurality of times, with the paddles 7 and the projections 8 being so arranged that rotational angles of the shaft 4 formed between successive oppositions may be equated. Referring more particularly to this positional arrangement between the paddles 7 and the projections 8, as shown in FIG. 2, in a rotational phase of the rotary driving shaft 4 where a paddle 7a is placed in opposition to a projection 8a, the opposite paddle 7b is not in opposition to a projection 8b, i.e. the arrangement serves to avoid sumultaneous oppositions between the opposite paddle pair and the projections. This arrangement is effective for lessening the striking shock to be transmitted to the rotary driving shaft 4 during one rotation thereof. Further, as shown in FIG. 1, the attaching positions of the projections 8 in the respective axial positions on the rotary driving shaft 4 are displaced from each other such that the oppositions between the paddle and the projection effective for substance removal may be evenly dispersed for the respective rotational phases of the driving shaft 4 during one rotation thereof. That is to say, as the driving shaft 4 makes on rotation, the substance removal operations are effected for a plurality of times. Accordingly, the striking shock per each removal operation is effectively reduced and also these shocks are substantially evenly dispersed for the respective rotational phases in the one rotation of the driving rotary shaft 4. Consequently, it becomes possible to stabilize the rotational torque of the driving rotary shaft 4 and also to reduce vibration and noise generation.

Further preferably, the paddles 7 are so mutually positioned that an interspace between operational tracks of leading edges adjacent to each other in the axial direction of the shaft 4 may be minimized. With this arrangement, since the process-object substance is constantly stirred by the rotating paddles 7 when the substance moves through the stirring chamber, the stirring device may achieve a highly desirable stirring effect regardless of the capacity of the stirring chamber. Incidentally, the above-described interspace between the adjacent operational tracks of the paddle edges may be substantially non-existent.

Alternate embodiments of the present invention will be described next.

The rotary driving shaft 4 may be oriented with a slight slope or arranged vertically as well as horizontally. It is also conceivable to provide a plurality of rotary shafts 4 in a parallel arrangement.

The shape, construction, number and position of the paddles 7 may be conveniently varied. For instance, it is possible to provide one or more than three paddles 7 at one axial position on the driving rotary shaft 4.

Further, the shape, construction, number and position of the projections 8 may be conveniently varied. For example, it is possible to provide a plurality of projections 8 on one operational track of leading edge of the paddle 7 with the projections 8 being peripherally displaced. Also, the projection 8 may be formed circular, rectangular, triangular or the like in cross section. Or, the projection 8 may be formed like an knife edge.

For evenly dispersing the substance removal operations, an axially adjacent pair of paddles 7 may be positioned with the same peripheral phase while peripherally displacing an axially adjacent projection pair 8. The substantially same effect may be achieved by the reverse arrangement, i.e. positioning the axially adjacent projection pair with the same peripheral phase and peripherally displacing the paddle pair. Further, combinations of these positional arrangements are also conceivable.

The stirring device may be adapted also for the batch method in place of the continuous processing method described above. Or, an interior lining for preventing frictional wear or substance adhesion may be additionally provided to the casing 2. That is, the specific construction of this stirring device may be appropriately modified depending on the necessity.

The stirring device of the present invention may be used for stirring various kinds of substances for a variety of purposes. For example, if the device is used for drying process, the casing 2 may be provided with a heating jacket for permitting introduction of a high temperature fluid into the casing 2.

What is claimed is:

1. A stirring device comprising:
   a cylindrical, elongated casing that forms a stirring chamber having an interior wall;
   an inlet at one end of said chamber;
   an outlet at an end opposite from said inlet downstream of said inlet;

a driven rotary shaft disposed along an axis of said casing;

a plurality of first and second pairs of oppositely disposed radially directed paddles having a leading edge and alternately secured onto said rotary shaft, each paddle of each pair of said first pairs of paddles being equally spaced in axially aligned rows relative to each other along an axial length of said driven rotary shaft;

each paddle of each pair of said second pairs of paddles being in axial alignment and spaced axially between each of said paddles of said first pairs of paddles and offset relative to said rows of said first pairs of paddles;

a plurality of radial projections attached to said interior wall of said casing, each radial projection of said plurality being equally spaced axially with a radial rotation relative to each other such that only one axially alternate projection is opposite a radial leading edge of only one paddle of each pair of said first and second pairs of oppositely disposed radially directed paddles and aligned with said one projection in a complete angular rotation of said driven shaft;

whereby the leading edges of each paddle of each of said first and second pairs of oppositely disposed radially directed paddles has a slight spacing from an opposite projection during rotation of said driven shaft and said leading edge of each of said paddles together with said projections form one substantially continuous cylindrical operational track with each rotation of said driven rotary shaft.

2. A stirring device as claimed in claim 1, wherein said pairs of said first and second pairs of paddles are adjacent each other in the axial direction of said driven rotary shaft and are displaced from each other in a rotational direction of 90° relative to each other.

3. A stirring device as claimed in claim 2, wherein said pairs of said first and second pairs of paddles are so arranged that an interspace between an adjacent pair of operational tracks of leading edges of said paddles is minimized in the axial direction of said driving rotary shaft.

4. A stirring device as claimed in claim 3, wherein during one rotation of said driven rotary shaft, said first and second pairs of paddles and said projections successively come into opposition for a plurality of times, with said paddles and said projections being so arranged that rotational angles of said shaft formed between successive oppositions are equated with each other.

5. A stirring device as claimed in claim 2, wherein during one rotation of said driven rotary shaft, said first and second pairs of paddles and said projections successively come into opposition for a plurality of times, with said paddles and said projections being so arranged that rotational angles of said shaft formed between successive oppositions are equated with each other.

6. A stirring device as claimed in claim 1, wherein said pairs of said first and second pairs of paddles are so arranged that an interspace between an adjacent pair of operational tracks of leading edges of said paddles is minimized in the axial direction of said driven rotary shaft.

7. A stirring device as claimed in claim 6, wherein during one rotation of said driven rotary shaft, said first and second pairs of paddles and said projections successively come into opposition for a plurality of times, with said paddles and said projections being so arranged that rotational angles of said shaft formed between successive oppositions are equated with each other.

8. A stirring device as claimed in claim 1, wherein during one rotation of said driven rotary shaft, said first and second pairs of paddles and said projections successively come into opposition for a plurality of times, with said paddles and said projections being so arranged that rotational angles of said shaft formed between successive oppositions are equated with each other.

* * * * *